(12) United States Patent
Beuneken et al.

(10) Patent No.: US 11,506,341 B2
(45) Date of Patent: Nov. 22, 2022

(54) CRYOGENIC FLUID STORAGE TANK AND METHOD FOR FILLING SAME

(71) Applicant: L'Air Liquide, Societe Anonyme pour l'Etude et l'Exploitation des Procedes Georges Claude, Paris (FR)

(72) Inventors: Olivier Beuneken, Le Blanc Mesnil (FR); Didier Geneste, Paris (FR); Regis Pointeau, Paris (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 17/311,115

(22) PCT Filed: Nov. 25, 2019

(86) PCT No.: PCT/FR2019/052791
§ 371 (c)(1),
(2) Date: Jun. 4, 2021

(87) PCT Pub. No.: WO2020/115393
PCT Pub. Date: Jun. 11, 2020

(65) Prior Publication Data
US 2021/0372565 A1 Dec. 2, 2021

(30) Foreign Application Priority Data
Dec. 6, 2018 (FR) .................................. FR 1872427

(51) Int. Cl.
*F17C 5/02* (2006.01)
*F17C 13/02* (2006.01)
*F17C 13/04* (2006.01)

(52) U.S. Cl.
CPC .............. *F17C 5/02* (2013.01); *F17C 13/025* (2013.01); *F17C 13/04* (2013.01);
(Continued)

(58) Field of Classification Search
CPC .... F17C 5/007; F17C 5/02; F17C 6/00; F17C 9/00; F17C 13/025; F17C 2201/032;
(Continued)

(56) References Cited

U.S. PATENT DOCUMENTS 2,993,344 A 7/1961 Reed
7,591,290 B2 * 9/2009 Bourgeois ............. F17C 13/025
141/83
(Continued)

FOREIGN PATENT DOCUMENTS

FR 2 238 893 2/1975
FR 2 845 451 4/2004
(Continued)

OTHER PUBLICATIONS

International Search Report and Written Report for PCT/FR2019/052791, dated May 13, 2020.
(Continued)

*Primary Examiner* — Timothy L Maust
*Assistant Examiner* — Christopher M Afful
(74) *Attorney, Agent, or Firm* — Christopher J. Cronin

(57) ABSTRACT

The invention relates to a tank for storing a cryogenic mixture of liquid and gas, comprising a first casing, a draw-off pipe for drawing off fluid, which has an upstream end connected to said first casing, a filling circuit comprising a first filling pipe with an upstream end to be connected to a fluid source and a downstream end connected to the lower portion of the first casing, said filling circuit comprising a second filling pipe connected to the fluid source and a downstream end connected to the upper portion of the first casing, wherein the upstream ends of said first and second filling pipes are designed to be connected to the same fluid source simultaneously, and a distribution valve assembly which is configured to allow distribution of the fluid in said
(Continued)

filling pipes, wherein the tank comprises a sensor assembly which measures the pressure in the first casing, said distribution valve assembly being configured to automatically adjust the pressure in the first casing, during filling, to a predetermined pressure setpoint (Pc) by means of the automatic distribution of the flow rate of fluid from the source in the filling pipes, depending on the pressure setpoint (Pc) and the pressure measured by the sensor assembly.

20 Claims, 2 Drawing Sheets

(52) U.S. Cl.
CPC ............. *F17C 2201/0109* (2013.01); *F17C 2201/032* (2013.01); *F17C 2203/0391* (2013.01); *F17C 2205/0326* (2013.01); *F17C 2205/0332* (2013.01); *F17C 2205/0338* (2013.01); *F17C 2205/0352* (2013.01); *F17C 2221/014* (2013.01); *F17C 2223/0161* (2013.01); *F17C 2225/0161* (2013.01); *F17C 2227/0393* (2013.01); *F17C 2250/043* (2013.01); *F17C 2260/021* (2013.01); *F17C 2265/065* (2013.01); *F17C 2270/0171* (2013.01)

(58) Field of Classification Search
CPC ........ F17C 2201/035; F17C 2205/0323; F17C 2205/0335; F17C 2205/0352; F17C 2205/0364; F17C 2223/0161; F17C 2225/0161; F17C 2227/0107; F17C 2227/0135; F17C 2250/0434; F17C 2250/0636; F17C 2270/0171; F17C 13/04; F17C 2201/0109; F17C 2203/0391; F17C 2205/0326; F17C 2205/0332; F17C 2205/0338; F17C 2221/014; F17C 2227/0393; F17C 2250/043; F17C 2260/021; F17C 2265/065
USPC .............................................................. 141/4
See application file for complete search history.

(56) References Cited

U.S. PATENT DOCUMENTS

| | | |
|---|---|---|
| 7,637,280 B2 | 12/2009 | Gaget et al. |
| 9,045,238 B2* | 6/2015 | Lohmann ............. B64F 1/28 |
| 9,765,931 B2 | 9/2017 | Beuneken et al. |
| 2015/0300570 A1* | 10/2015 | Beuneken ............ F17C 7/02 |
| | | 141/4 |

FOREIGN PATENT DOCUMENTS

| | | |
|---|---|---|
| FR | 2 857 432 | 1/2005 |
| FR | 2 896 302 | 7/2007 |
| FR | 2 941 767 | 8/2010 |
| FR | 2 998 642 | 5/2014 |
| JP | H06 34099 | 2/1994 |
| WO | WO 2014/091060 | 6/2014 |

OTHER PUBLICATIONS

French Search Report and Written Opinion for FR 1 872 427, dated Jul. 25, 2019.

* cited by examiner

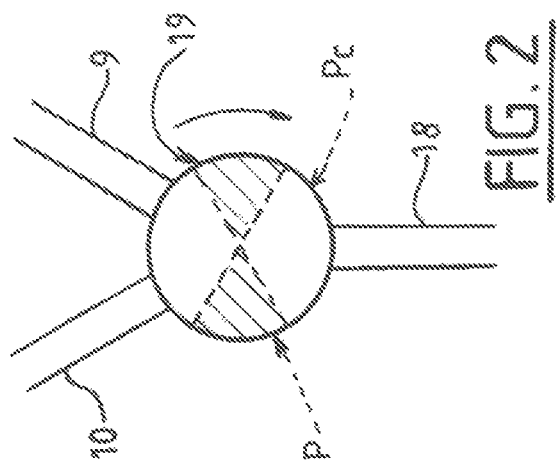
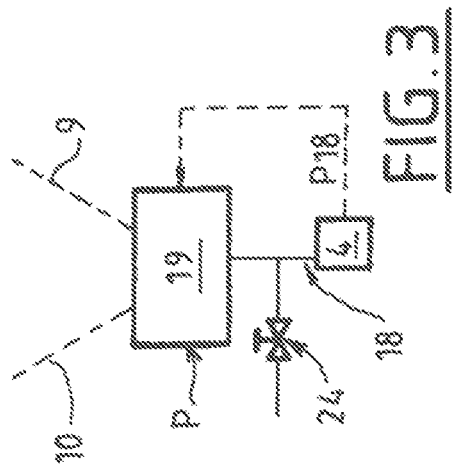
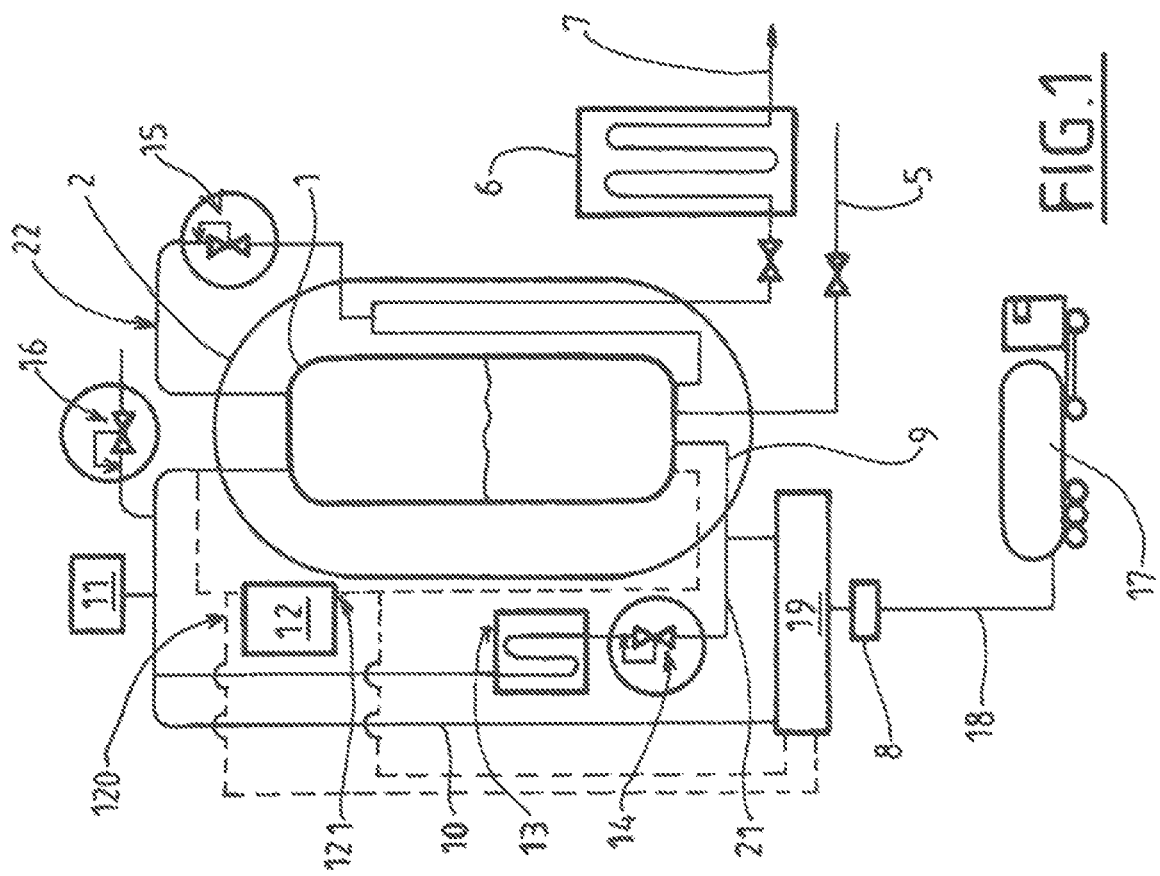

CRYOGENIC FLUID STORAGE TANK AND METHOD FOR FILLING SAME

CROSS-REFERENCE TO RELATED APPLICATIONS

This application is a § 371 of International PCT Application PCT/FR2019/052791, filed Nov. 25, 2019, which claims § 119(a) foreign priority to French patent application FR 1872427, filed Dec. 6, 2018.

BACKGROUND

Field of the Invention

The invention relates to a cryogenic fluid storage tank, as well as to its filling method.

More specifically, the invention relates to a tank for storing cryogenic fluid, and in particular a two-phase mixture of liquid and of gas, comprising a first casing intended to contain the cryogenic fluid, at least one drawing-off pipe having an upstream end connected to the first casing and being configured to allow fluid contained in the first casing to be drawn-off toward the outside of the tank, a circuit for filling the tank, the filling circuit comprising a first filling pipe having an upstream end intended to be connected to a fluid source and a downstream end connected to the lower portion of the first casing, the filling circuit comprising a second filling pipe having an upstream end intended to be connected to the fluid source and a downstream end connected to the upper portion of the first casing, the upstream ends of the first and second filling pipes being intended to be simultaneously connected to the same fluid source, the filling circuit comprising a set of one or more distribution valve(s) configured to allow the fluid originating from the fluid source to be distributed in the filling pipes, the tank comprising a set of one or more sensor(s) measuring the pressure in the first casing.

Related Art

Currently, the filling of fixed ("bulk") cryogenic liquid tanks from delivery semi-trailers is mainly manual.

This requires suitable training of the deliverer, who must take into account various parameters, including the pressure in the delivery hose, the pressure in the tank or, during filling, the maximum allowable pressure in the tank.

Furthermore, the filling valves that are used are generally ill-suited for regulating a flow of cryogenic fluid and require frequent maintenance and the use of additional valves.

The deliverer must also interrupt filling when the tank is full.

Thus, filling is often not optimized (duration and capacity of the pump that is used) and mainly depends on the experience and the skills of the deliverer.

Various methods have been contemplated for automating the safeguarding of this filling operation. For example, reference can be made to documents FR 2587432A1, FR 2896302 or FR 2998642A1.

The documents do not allow the filling of such a tank to be simplified and safeguarded or made more reliable.

SUMMARY OF THE INVENTION

An aim of the present invention is to overcome all or some of the aforementioned disadvantages of the prior art.

To this end, the tank according to the invention, and also in accordance with the generic definition provided in the above preamble, is basically characterized in that the set of one or more distribution valve(s) is configured to automatically regulate the pressure in the first casing to a predetermined setpoint pressure during filling by ensuring automatic distribution of the flow of fluid originating from the source in the filling pipes, as a function of the pressure setpoint and of the pressure measured by the set of one or more sensor(s).

Furthermore, embodiments of the invention can comprise one or more of the following features:

- the set of one or more distribution valve(s) comprises at least one valve that is pneumatically activated and/or is activated via a set of one or more return component(s), in particular one or more spring(s);
- the set of one or more distribution valve(s) is sensitive to the pressure measured by the set of one or more sensor(s) measuring the pressure in the first casing, i.e. the set of one or more distribution valve(s) has at least one movable element closing or opening a passage for the fluid between the fluid source and the one or more filling pipe(s), said movable element being moved into a plurality of positions according to the pressure difference between, on the one hand, a setting force corresponding to the predetermined pressure setpoint and, on the other hand, the pressure measured by the set of one or more sensor(s);
- the set of one or more distribution valve(s) comprises at least one electrically controlled valve and an electronic device for controlling the controlled valve configured to control the opening and closing of the valve as a function of, on the one hand, the predetermined pressure setpoint and, on the other hand, the pressure measured by the set of one or more sensor(s);
- the set of one or more distribution valve(s) comprises a housing comprising a fluid inlet intended to be connected to the source, two outlets respectively connected to the two filling pipes and a translationally and/or rotationally movable distributor located in the housing and ensuring the connection or the non-connection of the inlet with the one or more outlet(s) according to the position of the movable distributor;
- the housing of the set of one or more valve(s) comprises an additional inlet connected to the set of one or more sensor(s) and/or to control electronics and/or to a mechanical and/or pneumatic control assembly, particularly such as a set of one or more spring(s) and/or membrane(s);
- the set of one or more distribution valve(s) is configured to interrupt any passage of fluid originating from the source toward the filling pipes when the pressure measured by the set of one or more sensor(s) is higher than a first determined safety threshold;
- the set of one or more distribution valve(s) is configured to implement automatic distribution of the flow of fluid originating from the source, predominantly, and preferably exclusively, in the second filling pipe when the pressure measured by the set of one or more sensor(s) is lower than the safety threshold and higher than the pressure setpoint;
- the set of one or more distribution valve(s) is configured to simultaneously implement automatic distribution of the flow of fluid originating from the source in the two filling pipes when the pressure measured by the set of one or more sensor(s) equals the pressure setpoint;

the set of one or more distribution valve(s) is configured to implement automatic distribution of the flow of fluid originating from the source, predominantly, and preferably exclusively, in the first filling pipe when the pressure measured by the set of one or more sensor(s) is lower than the pressure setpoint;

the tap comprises a detection component intended to measure the pressure in the fluid source, and in that the set of one or more distribution valve(s) is configured to interrupt any passage of fluid originating from the source toward the filling pipes when the pressure measured by the detection component is lower than a second determined threshold;

the pressure measured by the set of sensor(s) comprises at least one from among: the pressure in the upper part of the first casing, the pressure in the lower part of the first casing, a pressure difference between the pressure in the upper part of the first casing and the pressure in the lower part of the first casing;

the tank comprises a pipe for pressurizing the internal casing comprising an upstream end connected to the lower end of the first casing and a downstream end connected to the upper part of the first casing, the pressurization pipe comprising at least one regulating valve and a heater, in particular a vaporization heat exchanger;

the at least one regulating valve of the pressurization pipe is included in or made up of the set of one or more distribution valve(s);

the tank comprises a connection flange with one end connected to the set of one or more valve(s), and in particular fluidly connected to the upstream ends of the first and second filling pipes, and one end intended to be connected to a pressurized fluid source, in particular an end of a hose of a pressurized fluid delivery truck;

the tank comprises a manually activated component for controlling the position of the set of valves in order to manually force the distribution of the flow of fluid originating from the source in the filling pipes;

the tank comprises a display for displaying the status or the configuration or the position of the set of valves;

the tank comprises, for example, on the filling circuit, a protection component, such as a valve and/or a shear disk, allowing fluid to be released toward the outside in the event of pressure exceeding a limit;

the regulating valve is configured to automatically maintain the pressure in the first casing at a minimum value by ensuring, when the pressure in the first casing is lower than said first value, that liquid taken from the first casing is circulated in the heater and that this heated fluid is re-introduced into the first casing;

the regulating valve of the pressurization pipe is sensitive to the pressure measured by the set of one or more sensor(s) measuring the pressure in the first casing, i.e. the regulating valve comprises at least one movable element closing or opening a passage for the fluid in the pressurization pipe, said movable element being opened or closed according to the pressure difference between, on the one hand, a setting force corresponding to a minimum pressure setpoint and, on the other hand, the pressure measured by the set of one or more sensor(s);

the set of one or more distribution valve(s) is located on the pressurization pipe;

the housing of the set of one or more distribution valve(s) comprises a fluid inlet connected to the upstream end of the pressurization pipe and an outlet connected to the pressurization pipe portion comprising the heater;

the pressurization pipe comprises a portion shared with at least one from among: the first filling pipe, the second filling pipe;

the gas drawing-off pipe comprises a first upstream end connected to the lower end of the internal casing;

the tank comprises a gas drawing-off pipe comprising a second upstream end connected to the upper end of the internal casing and a downstream end intended to be connected to a gas user;

the gas drawing-off pipe comprises at least one from among: a valve, a heater, in particular a heat exchanger;

the tank comprises an air venting regulator connected to the upper end of the internal casing, in particular via the downstream end of the second filling pipe.

The invention also relates to a method for filling a cryogenic fluid storage tank according to any one of the aforementioned or following features with liquefied gas, the method comprising a step of connecting a pressurized liquefied gas source to the tank, in which step a fluid connection is made between the liquefied gas source and the upstream ends of the first and second filling pipes, a step of measuring the pressure in the internal casing of the tank via the set of one or more sensor(s), a step of transferring fluid from the source toward the inside of the internal casing, and a step of distributing the flow of fluid in the two filling pipes as a function of a predetermined pressure setpoint and of the pressure measured by the set of one or more sensors(s).

The invention can also relate to any alternative device or method comprising any combination of the aforementioned or following features.

BRIEF DESCRIPTION OF THE FIGURES

Further particular features and advantages will become apparent upon reading the following description, which is provided with reference to the figures, in which:

FIG. 1 shows a schematic and partial vertical section view illustrating an example of the structure and of the operation of one possible embodiment of the tank;

FIG. 2 shows a schematic and partial section view illustrating details of a first example of the structure and of the operation of a distribution valve that can form part of such a tank;

FIG. 3 shows a schematic and partial view illustrating another example of the structure and of the operation of a distribution valve that can form part of such a tank;

DETAILED DESCRIPTION OF THE INVENTION

Figure 4:
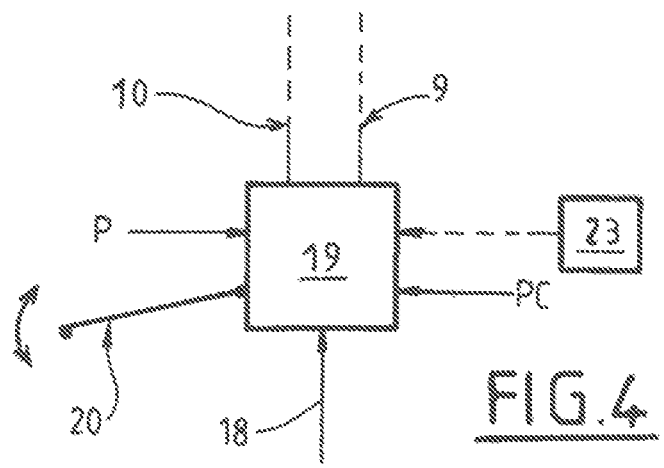
FIG. 4 shows a schematic and partial view illustrating another example of the structure and of the operation of a distribution valve that can form part of such a tank.

The tank shown in FIG. 1 is a tank for storing cryogenic fluid, and in particular a two-phase mixture of liquid and of gas.

Preferably, the tank is a double-casing cryogenic tank, comprising a first internal casing 1 intended to contain the cryogenic fluid. The first casing 1 is preferably surrounded by a second casing 2 and the tank can comprise thermal insulation in the space between the two casings (in particular a vacuum space).

Typically, the first casing 1 contains a liquid phase in the lower part (cryogenic fluid in liquid form at a very low temperature, for example, nitrogen is at a temperature of −185° c at a pressure of 2 bar, the value of the temperature depends on the equilibrium pressure) and a gaseous phase in the upper part ("gaseous ceiling").

Conventionally, the tank comprises at least one drawing-off pipe 5, 7 having an upstream end connected to the first casing 1 and being configured to allow fluid contained in the first casing 1 to be drawn-off toward the outside of the tank. For example, and as illustrated, the tank can comprise a first drawing-off pipe 5, the upstream end of which is connected to the lower part of the first casing 1 in order to draw-off liquid (and preferably via a valve).

Similarly, the tank can comprise a second drawing-off pipe 7, a first upstream end of which is connected to the lower part of the first casing 1 in order to draw-off liquid. The second drawing-off pipe 7 can comprise a vaporizer 6 (heater) and at least one valve for the downstream supply of the vaporized gas to a user. This external use heater 6 can be a heat exchanger used to convert the cryogenic liquid drawn-off from the internal tank into gas through an exchange with the ambient atmosphere.

As illustrated in FIG. 1, the second drawing-off pipe 7 can comprise a second upstream end connected to the upper end of the first casing 1. This second upstream end can be provided with a valve 15 or a pressure regulator.

This valve 15 or economizer is configured to open the passage between the gaseous phase of the first casing 1 and the downstream exterior when the pressure in this upper part of the first casing 1 is higher than a predetermined and, for example, preset pressure. For example, this predetermined pressure is equal to the working pressure of the tank +0.5 bar. This allows the pressure in the gaseous phase of the first casing 1 to be regulated downward, when necessary, when gas originating from the tank is used.

Conventionally, the tank can comprise a protection component 11, such as a valve and/or a shear disc, allowing fluid to be released toward the outside in the event of pressure exceeding a limit in the first casing 1. Typically, this limit is the maximum allowable pressure of the tank (provided by the manufacturer).

Furthermore, the tank can comprise an air venting regulator 16 configured to open a passage between the gaseous phase and the outside (the atmosphere) when the pressure in the gaseous phase is higher than a pressure set on the appliance (typically the opening pressure of the protection component 11, less one bar).

This allows, when necessary, the pressure of the gaseous phase to be reduced in the event that gas is not used by the client. Indeed, when gas is not drawn-off for a long period, this causes a natural increase in pressure inside the first casing 1.

The tank comprises a circuit for filling the first casing 1.

This filling circuit comprises a first filling pipe 9 with an upstream end intended to be connected to a fluid source (such as a hose 18 of a container 17 transported by a truck) and a downstream end connected to the lower portion of the first casing 1.

The filling circuit comprises a second filling pipe 10 having an upstream end intended to be connected to the fluid source 17 and a downstream end connected to the upper portion of the first casing 1.

The upstream ends of the first 9 and second 10 filling pipes are configured to be simultaneously connected to the same fluid source 17, for example, at a shared inlet or flange 8.

The filling circuit comprises a set 19 of one or more distribution valve(s) configured to allow the fluid originating from the fluid source 17 to be distributed in either of or in the filling pipe(s) 9, 10.

The tank comprises a set 12 of one or more sensor(s) measuring the pressure in the first casing 1.

The set 19 of one or more distribution valve(s) is configured to automatically regulate the pressure in the first casing 1 to a predetermined setpoint pressure (Pc) during filling by ensuring automatic distribution of the flow of fluid originating from the source 17 between the filling pipes 9, 10, as a function of the pressure setpoint Pc and of the pressure measured by the set 12 of one or more sensor(s).

The pressure setpoint Pc is predefined and typically is the working pressure of the tank (for example, as a function of the requirement of the gas user and of the installation downstream of the tank). This pressure can be the pressure at which the fluid of the gaseous ceiling must be maintained according to the use in the gaseous ceiling, or the pressure at which the liquid part in the bottom of the tank must be maintained (fluid in its liquid phase).

The maximum working pressure of the tank generally ranges between one and forty bar, in particular between 7 and 12 bar depending on the types and sizes of tanks. This maximum working pressure (or "maximum allowable working pressure") is, for example, defined by the tank manufacturer.

Preferably, the tank comprises a filling terminal 8 or a flange for connecting the delivery hose 19 of the source 17.

The set 12 of one or more sensor(s) can comprise a stage for measuring the pressure and, optionally, the level of liquid.

This set 12 of one or more sensor(s) preferably measures (and displays and/or transmits, if applicable) the pressure prevailing in the gaseous phase (upper part) and/or the pressure in the lower part (in the liquid phase), as well as the level of liquid in the liquid phase (lower part of the first casing). This level of liquid can be determined by the pressure difference between the bottom and the top of the first casing, from which the height of the hydrostatic fluid column is deduced.

The pressure of the fluid at the lower end of the first casing is equal to the pressure of the gaseous phase, increased by the hydrostatic pressure generated by the height of liquid in the liquid phase 3.

To this end, the set 12 of one or more sensors can comprise a pressure tap for the gaseous phase (measured in the upper part of the first casing 1) and a pressure tap for the liquid phase (measured in the lower part of the first casing 1). These two pressure taps are symbolically shown by the ends of the dashed lines connected in the lower and upper part of the tank and to the measurement housing 12.

Conventionally, the set 12 of one or more sensor(s) can comprise sensors of the type measuring a static pressure and/or a differential pressure.

As illustrated in FIG. 1, the tank can also comprise a pipe 21 for pressurizing the first casing 1 comprising an upstream end connected to the lower end of the tank and a downstream end connected to the upper part of the first casing 1. The pressurization pipe 21 comprises at least one regulating valve 14 (or regulator) and a heater 13, in particular a vaporization heat exchanger.

The heater 13 allows liquid taken from the bottom of the first casing 1 to be vaporized in order to generate the gas, which allows, when necessary, the pressure of the gaseous phase to be increased by means of the regulator 14. This pressurization regulator 14 opens, if necessary, the passage for the liquid from the liquid phase to its gaseous phase when the pressure of the gaseous phase is lower than a pressure that is set on the appliance, in particular the working pressure.

The regulating valve 14 of the pressurization pipe 21 can be pneumatic or controlled and particularly can be sensitive to the pressure measured by the set 12 of one or more sensor(s) measuring the pressure in the first casing 1. For example, the regulating valve 14 can comprise at least one movable element closing or opening a passage for the fluid in the pressurization pipe 21, said movable element being opened or closed according to the pressure difference between, on the one hand, a setting force (force of a spring or of a back-pressure, for example) corresponding to a minimum pressure setpoint and, on the other hand, the pressure measured by the set 12 of one or more sensor(s).

It should be noted that the functions of the regulating valves 14 (pressurization) and 15 (economizer) can be consolidated into a single appliance, called "regulator-economizer".

The set 19 of one or more distribution valve(s) can be configured to automatically regulate the pressure in the first casing 1 to the predetermined pressure setpoint Pc of the tank during filling. This regulation is implemented by filling the first casing 1 only via the first filling pipe 9 or only via the second filling pipe 10 or via the two pipes simultaneously.

The set 19 of valves regulates the flow (through section) and the distribution of the cryogenic liquid supplied by the source 17 in the two pipes 9, 10 in order to maintain or reach this setpoint pressure Pc.

The set 19 of one or more valve(s) can comprise at least one pneumatic valve. Preferably, the set 19 of one or more valve(s) is a solely mechanical and/or pneumatic device.

For example, a pressure is maintained on a valve (gas pressure and/or spring or equivalent) that converts a valve into a pressure regulator.

For example, the set 19 of one or more distribution valve(s) is sensitive to the pressure measured by the set 12 of one or more sensor(s) measuring the pressure in the first casing 1. In other words, the set 19 of one or more distribution valve(s) can comprise at least one movable element closing or opening a passage for the fluid between the fluid source 17 and the one or more filling pipes 9, 10. This movable element is, for example, moved into a plurality of positions according to the pressure difference between, on the one hand, a setting force corresponding to the predetermined pressure setpoint Pc and, on the other hand, the pressure measured by the set 12 of one or more sensor(s).

The set 19 of one or more distribution valve(s) can be housed in a housing comprising a fluid inlet intended to be connected to the source 17 (end of the hose 19, for example), two outlets respectively connected to the two filling pipes 9, 10 and/or a distributor (the movable distribution element) that can move in the housing to ensure the connection or non-connection of the inlet with the one or more outlet(s) according to the pressure measured by the set 12 of sensor(s) and the pressure setpoint Pc.

The housing of the set 19 of one or more valve(s) can comprise at least one inlet connected to the set 12 of one or more sensor(s) supplying the one or more pressure measurement(s) P (pressure in the upper part, pressure in the lower part, pressure measurement in the source 17, in particular at the hose 18). For example, as schematically shown in FIG. 3, a detection component 4 (integrated in or separate from the set 12 of sensors) measures the pressure P18 in the fluid source 17, 18 (for example, at the hose) and the set 19 of one or more distribution valve(s) can be configured to interrupt any passage of fluid originating from the source 17, 18 toward the filling pipes 9, 10 when the pressure measured by the detection component 4 is lower than a second determined threshold (for example, lower than one barg=one relative bar). This automatic safety measure prevents any spillage from the tank, particularly if the hose breaks or is incorrectly connected.

The set 19 of one or more valve(s) can also integrate pressure setpoints (pressure setpoint Pc and first safety threshold that corresponds to the maximum allowable pressure in the tank).

For example, the movable element can rotationally and/or translationally move.

FIG. 2 schematically shows the case of a rotationally movable element. For example, a rotary sphere or cylinder provided with solid/hollow sectors allows mitigation or distribution of the flow between an inlet (connected to the hose of the source 17) and two outlets respectively connected to the two filling pipes 9, 10. The position of the movable element is, for example, the result of the forces provided by a pressure setpoint Pc and the pressure P measured by the set 12 of sensors.

Of course, this embodiment is not limiting. The set 19 of valves could comprise a translationally movable element, in particular the set 19 of valves could comprise a slide valve. For example, see document FR 2845451A1.

Figure 5:
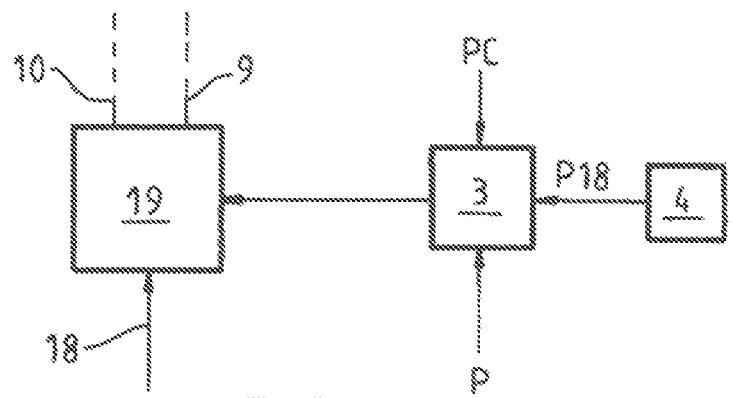
FIG. 5 shows a schematic and partial view illustrating another example of the structure and of the operation of a distribution valve that can form part of such a tank.

Of course, and as shown in FIG. 5, the set 19 of one or more distribution valve(s) could also comprise or be made up of at least one electrically controlled valve and an electronic device 3 for controlling the controlled valve configured to control the flow as a function of, on the one hand, the predetermined pressure setpoint Pc and, on the other hand, the pressure P measured by the set 12 of one or more sensor(s).

Figure 7:
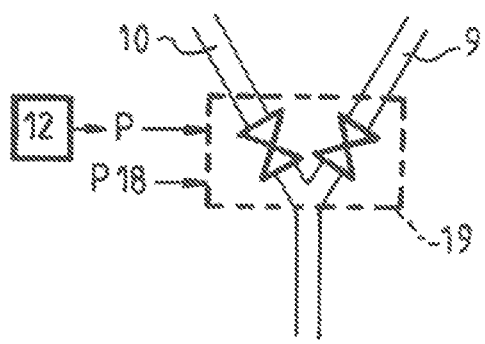
FIG. 7 shows a schematic and partial section view illustrating details of a second example of the structure and of the operation of a distribution valve that can form part of such a tank.

In the example of FIG. 7 two controlled or pneumatic or mechanical valves ensure regulation in the two pipes 9, 10, respectively.

Thus, the set 19 of one or more valve(s) can comprise one or more pneumatic or controlled valve(s), two-way valves, three-way valves or any configuration or combination allowing this aforementioned control.

The set 19 of one or more distribution valve(s) can be configured to automatically interrupt any passage of fluid originating from the source 17 toward the filling pipes 9, 10 when the pressure measured by the set 12 of one or more sensor(s) is higher than a first determined safety threshold (for example, this first threshold can be equal to the maximum allowable pressure of the tank, less a difference that is equal to one bar, for example).

Furthermore, the set 19 of one or more distribution valve(s) can be configured to implement automatic distribution of the flow of fluid originating from the source 17, predominantly, and preferably exclusively, in the second filling pipe 10 when the pressure measured by the set 12 of one or more sensor(s) is lower than the safety threshold and higher than the pressure setpoint Pc. In other words, during filling, if the measured pressure ranges between the setpoint pressure Pc and the first safety threshold, the set 19 of one or more valve(s) favors filling via the pipe 10.

Furthermore, the set 19 of one or more distribution valve(s) can be configured to simultaneously implement automatic distribution of the flow of fluid originating from the source 17 in the two filling pipes 9, 10 when the pressure measured by the set 12 of one or more sensor(s) is equal or substantially equal to the pressure setpoint Pc (i.e. the working pressure plus or minus a few percent). Preferably, the filling flow is equally distributed between the two filling pipes 9, 10, but could be distributed in different adjustable proportions.

Furthermore, the set 19 of one or more distribution valve(s) can be configured to implement automatic distribution of the flow of fluid originating from the source 17, predominantly, and preferably exclusively, in the first filling pipe 9 when the pressure measured by the set 12 of one or more sensor(s) is lower than the pressure setpoint Pc.

Thus, depending on the pressure measured in the tank, the set 19 of valves favors filling from above (as a spray in order to limit/reduce the pressure) or from below (in order to increase the pressure inside the tank) or both (in order to keep the pressure substantially constant).

Thus, in order to ensure filling, the deliverer connects a pressurized liquefied gas source to the tank. For example, they connect the end of the hose 18 to a terminal or flange of the tank. They thus connect the source to the filling circuit. The deliverer can open an isolation valve and the set 19 of one or more valve(s) will automatically implement (or prevent) the transfer of fluid toward the tank according to the predetermined pressure setpoint Pc and the pressure measured by the set 12 of one or more sensor(s).

As illustrated in FIG. 4, the tank can comprise a display 23 for displaying the status or the configuration or the position of the set 19 of one or more valve(s) and/or the pressure in the tank.

Furthermore, the tank can comprise a manually activated component 20 for controlling the position of the set 19 of valves in order to manually force the distribution of the flow of fluid originating from the source 17 in the filling pipes 9, 10 (and/or the closure of the filling circuit).

Figure 6:
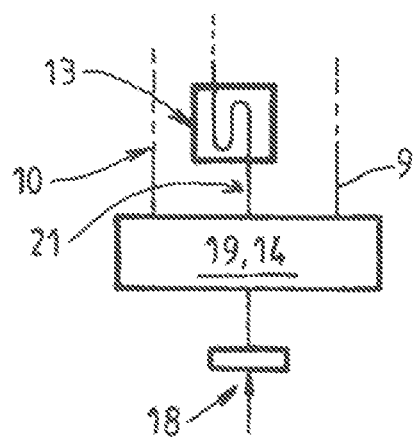
FIG. 6 shows a schematic and partial view illustrating another example of the structure and of the operation of a distribution valve that can form part of such a tank.

As schematically shown in FIG. 6, the regulating valve 14 of the pressurization pipe 21 can be included in or made up of the set 19 of one or more valve(s) for distributing the filling flow.

For example, the set of one or more distribution valve(s) can be located on the pressurization pipe 21.

For example, the housing of the set 19 of one or more valve(s) can comprise an outlet configured to ensure (outside the filling phase) that liquid taken from the tank is conveyed toward the pressurization pipe 21 provided with the heater 13.

The liquid can be taken from the tank, for example, via a fluid inlet connected to the upstream end of the pressurization pipe 21.

As illustrated in FIG. 1, the pressurization pipe 21 can comprise a portion that is shared with at least one from among: the first filling pipe 9 (for example, shared ends connected to the upper end of the first casing 1), the second filling pipe 10 (for example, shared ends connected to the lower part of the first casing 1).

This recirculation with heating can be implemented automatically in response to a working pressure lower than the predetermined setpoint Pc.

Thus, whilst being simple and inexpensive (in particular when the set 19 of one or more valve(s) is purely mechanical and/or pneumatic), the tank has a filling circuit that automatically regulates the pressure in the tank during filling. This allows quicker and safer filling, in particular of fixed, large capacity tanks.

The tank is thus automatically protected against any overpressures or underpressures.

If applicable, the device can allow the hose to be purged via a purge valve at the connection between the hose and the tank filling circuit (for example, see reference 24 FIG. 3).

Advantageously, the device can comprise a function for interrupting filling (closure of the set 19 of one or more valve(s)) if the hose breaks (detected by a drop in pressure at this level, as described above).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A tank for storing a two-phase mixture of a gaseous and liquid cryogenic fluid, comprising: a first casing intended to contain the cryogenic fluid; at least one drawing-off pipe having an upstream end connected to the first casing and being configured to allow fluid contained in the first casing to be drawn-off toward the outside of the tank; a circuit for filling the tank; and a set of one or more sensor(s) measuring the pressure in the first casing, wherein:

the filling circuit comprises a first filling pipe having an upstream end intended to be connected to a fluid source of the cryogenic fluid and a downstream end connected to the lower portion of the first casing, a second filling pipe having an upstream end intended to be connected to the fluid source and a downstream end connected to the upper portion of the first casing, and a set of one or more distribution valve(s) configured to allow the fluid originating from the fluid source to be distributed in the filling pipes;

the upstream ends of the first and second filling pipes are intended to be simultaneously connected to the same fluid source;

the set of one or more distribution valve(s) is configured to automatically regulate the pressure in the first casing to a predetermined setpoint pressure (Pc) during filling by ensuring automatic distribution of the flow of fluid originating from the source in the filling pipes, as a function of the pressure setpoint (Pc) and of the pressure measured by the set of one or more sensor(s);

the set of one or more distribution valve(s) comprises a housing that comprises a fluid inlet intended to be connected to the source, two outlets respectively connected to the two filling pipes, and a translationally and/or rotationally movable distributor located in the housing that ensures connection or non-connection of the fluid inlet with the two outlets according to the position of the movable distributor; and the set of one or more distribution valve(s) is configured to automatically interrupt any passage of fluid originating from the source toward the filling pipes when the pressure measured by the set of one or more sensor(s) is higher than a first determined safety threshold.

2. The tank of claim 1, further comprising a detection component configured to measure the pressure (P18) in the fluid source, wherein the set of one or more distribution valve(s) is configured to interrupt any passage of fluid originating from the source toward the filling pipes when the pressure measured by the detection component is lower than a second determined threshold.

3. The tank of claim 1, wherein the set of one or more distribution valve(s) comprises at least one valve that is pneumatically activated and/or is activated via a set of one or more spring(s).

4. The tank of claim 1, wherein:

the set of one or more distribution valve(s) is sensitive to the pressure measured by the set of one or more sensor(s) measuring the pressure in the first casing;

the set of one or more distribution valve(s) has at least one movable element closing or opening a passage for the fluid between the fluid source and the first and second filling pipes; and said movable element is moved into a plurality of positions according to the pressure difference between a setting force corresponding to the predetermined pressure setpoint (Pc) and the pressure measured by the set of one or more sensor(s).

5. The tank of claim 1, wherein the set of one or more distribution valve(s) comprises at least one electrically controlled valve and an electronic device for controlling the controlled valve configured to control the opening and the closing of the valve as a function of the predetermined pressure setpoint (Pc) and the pressure measured by the set of one or more sensor(s).

6. The tank of claim 1, wherein the housing of the set of one or more valve(s) comprises an additional inlet connected to the set of one or more sensor(s).

7. The tank of claim 1, wherein the housing of the set of one or more valve(s) comprises an additional inlet connected to control electronics.

8. The tank of claim 1, wherein the housing of the set of one or more valve(s) comprises an additional inlet connected to a mechanical and/or pneumatic control assembly, the mechanical and/or pneumatic control assembly being a set of one or more spring(s) and/or membrane(s).

9. The tank of claim 1, wherein the set of one or more distribution valve(s) is configured to interrupt any passage of fluid originating from the source toward the filling pipes when the pressure measured by the set of one or more sensor(s) is higher than the first determined safety threshold.

10. The tank of claim 9, wherein the set of one or more distribution valve(s) is configured to implement automatic distribution of the flow of fluid originating from the source, predominantly in the second filling pipe when the pressure measured by the set of one or more sensor(s) is lower than the first determined safety threshold and higher than the pressure setpoint (Pc).

11. The tank of claim 10, wherein the set of one or more distribution valve(s) is configured to implement automatic distribution of the flow of fluid originating from the source exclusively in the second filling pipe when the pressure measured by the set of one or more sensor(s) is lower than the safety threshold and higher than the pressure setpoint (Pc).

12. The tank of claim 9, wherein the set of one or more distribution valve(s) is configured to simultaneously implement automatic distribution of the flow of fluid originating from the source in the two filling pipes when the pressure measured by the set of one or more sensor(s) is equal to the pressure setpoint (Pc).

13. The tank of claim 9, wherein the set of one or more distribution valve(s) is configured to implement automatic distribution of the flow of fluid originating from the source predominantly in the first filling pipe when the pressure measured by the set of one or more sensor(s) is lower than the pressure setpoint (Pc).

14. The tank of claim 13, wherein the set of one or more distribution valve(s) is configured to implement automatic distribution of the flow of fluid originating from the source exclusively in the first filling pipe when the pressure measured by the set of one or more sensor(s) is lower than the pressure setpoint (Pc).

15. The tank of claim 1, further comprising a detection component intended to measure the pressure (P18) in the fluid source, wherein the set of one or more distribution valve(s) is configured to interrupt any passage of fluid originating from the source toward the filling pipes when the pressure measured by the detection component is lower than a second determined threshold.

16. The tank of claim 1, wherein the pressure measured by the set of sensor(s) comprises at least one from among: a pressure in the upper part of the first casing, a pressure in the lower part of the first casing, and a pressure difference between the pressure in the upper part of the first casing and the pressure in the lower part of the first casing.

17. The tank of claim 1, further comprising a pipe for pressurizing the internal casing comprising an upstream end connected to the lower end of the first casing and a downstream end connected to the upper part of the first casing, the pressurization pipe comprising at least one regulating valve and a heater.

18. The tank of claim 17, wherein the heater is a vaporization heat exchanger.

19. The tank of claim 17, wherein the at least one regulating valve of said pipe for pressurizing the internal casing is included in or made up of the set of one or more distribution valve(s).

20. A method for filling a cryogenic fluid storage tank with liquefied gas, the method comprising:
  providing the cryogenic fluid storage tank of claim 16 that stores the two-phase mixture of a gaseous and liquid cryogenic fluid;
  connecting a pressurized source of the cryogenic fluid to the tank, in which step a fluid connection is made between the pressurized source and the upstream ends of the first and second filling pipes;
  measuring a pressure in the internal casing of the tank via the set of one or more sensor(s);
  transferring the cryogenic fluid from the pressurized source toward the inside of the internal casing; and
  distributing a flow of fluid in the two filling pipes as a function of a predetermined pressure setpoint (Pc) and of the pressure measured by the set of one or more sensors (s).

* * * * *